United States Patent Office 3,206,354
Patented Sept. 14, 1965

3,206,354
LAMINATED HEAT-FORMABLE SHEET MATERIAL HAVING A PROTECTIVE SKIN COMPRISING POLYVINYL CHLORIDE RESIN AND CURED BUTADIENE-ACRYLONITRILE RUBBER
Robert W. Pooley, Mishawaka, Ind., assignor to United States Rubber Company, New York, N.Y., a corporation of New Jersey
No Drawing. Filed Oct. 11, 1963, Ser. No. 315,707
3 Claims. (Cl. 161—161)

This invention relates to a heat-formable laminated sheet material, and more particularly it relates to a laminated sheet material comprising an expanded core of gum-plastic material, a covering layer of solid gum-plastic material, and an outer protective skin comprising a blend of butadiene-acrylonitrile rubber and polyvinyl chloride resin.

The invention is an improvement on laminated sheet materials such as are described in U.S. Patents 3,041,220 issued to Martin et al. on June 26, 1962, and 3,070,817, issued to Kohrn et al. on January 1, 1963. Specifically, the improvement resides in the provision of a protective surface skin based on a mixture of butadiene-acrylonitrile rubber and polyvinyl chloride resin in place of the protective surface skins employed on the laminates disclosed in said prior patents.

The need for the invention arises from the fact that the protective skins referred to in 3,041,220 and 3,070,817 have been found not to be entirely satisfactory in certain respects under some circumstances. In particular, it has been desired to provide, on the laminate, firmly adherent outer protective skins which are harder than those available and which are more resistant to picking up dirt. The invention is based on the discovery that a firmly adherent protective skin based on a blend of butadiene-acrylonitrile rubber and polyvinyl chloride resin can be applied to the laminate conveniently and economically and such skin is not only hard and resistant to the embedment of dirt but is firmly adherent and has many other advantages which will be manifest from the following detailed description.

The improved laminate of the invention may be shaped at elevated temperatures, particularly with the aid of vacuum or other differential pressure, into useful articles of all sorts such as truck bodies or cabs, automotive hoods, trailer bodies, camping bodies, boat hulls, decks, luggage and the like, that are light in weight but are strong, impact-resistant, buoyant, and have other advantages.

The laminate of the present invention may be described as comprising a relatively thick expanded or blown cellular core sheet made of gum plastic (rubber-resin composition) based on ABS (acrylonitrile, butadiene, styrene) polymeric material, each face of which is integrally united to a thinner sub-strate sheet of the gum plastic in a solid, unblown state, at least one such sub-strate in turn being covered on its outer face by an integrally united thin protective skin based on a blend of butadiene-acrylonitrile rubber and polyvinyl chloride resin. The central core member and the sub-strate layers of gum plastic are adequately described in the U.S. Patents 3,041,220 and 3,070,817 mentioned previously. Such gum plastic based on ABS material is rigid and contains a major proportion (51 to 90 parts by weight) of resinous component and a minor proportion (correspondingly 49 to 10 parts, per 100 parts of gum plastic polymers) of rubbery component. Such ABS material may be either a physical mixture of a separately prepared resin (styrene-acrylonitrile copolymer resin containing 50 to 90% by weight of styrene and correspondingly 50 to 10% acrylonitrile) with a separately prepared rubber (butadiene-acrylonitrile copolymer rubber containing 50–85% by weight of butadiene and correspondingly 50–15% acrylonitrile), or it may be based at least in part on so-called graft copolymer in which rubber and resin are at least partially chemically combined (graft copolymer made by copolymerizing resin-forming monomers such as styrene and acrylonitrile in a previously prepared aqueous emulsion polymerizate of a rubber such as polybutadiene). Such graft copolymer may be combined with additional separately prepared styrene-acrylonitrile resin and/or butadiene acrylonitrile rubber to provide a desired over-all ratio of resinous component to rubbery component. Frequently the resulting ABS composition contains about 15–30% acrylonitrile, about 15–40% butadiene, and about 40–60% styrene, by weight, based on the entire ABS polymer as 100%. If desired the described polymers may be supplemented or replaced at least in part by equivalent polymers based for example on homologs or substitution products of the described monomers, e.g., alpha methyl styrene or dichlorostyrene in place of styrene, methacrylonitrile in place of acrylonitrile. Instead of basing the resinous portion of the gum plastic entirely on styrene-acrylonitrile resin, such resinous portion may be based on a mixture of styrene-acrylonitrile resin and a vinyl resin, such as a vinyl chloride resin, especially polyvinyl chloride or the like (in ratio of, for example, 10 parts of styrene-acrylonitrile resin to up to 10 parts of polyvinyl chloride) while preserving the previously described over-all ratio of resin to rubber. Usually it is advantageous to blend the polymers by mixing aqueous latices of the polymers and then coagulating the mixture, but the described blends may also be made by mill mixing the dry, solid polymers.

The manner in which the gum plastic materials comprising the central core member and intermediate sub-strate layers are compounded with suitable conventional compounding ingredients such as small amounts of plasticizer, antioxidant, stabilizer, and if desired vulcanizing ingredients such as sulfur and accelerator, pigments or fillers, and the like, is amply described in 3,041,220 and 3,070,817. In addition, as described in those patents, the composition for the core includes a blowing agent [e.g., dinitroso pentamethylene tetramine, azodicarbonamide, or p,p'-oxybis-(benzenesulfonyl hydrazide)] capable of decomposing at elevated temperature to evolve gas which causes the core member to become expanded or blown to a cellular condition. The intermediate sub-strate layers, which are solid, of course contain no blowing agent but may otherwise be compounded essentially similarly to the core composition.

Considering now the composition of the external protective skin layer applied over the outer surface of the intermediate solid sub-strate layers superimposed on the expanded core, such skin layer in accordance with the invention is comprised, as indicated, of butadiene-acrylonitrile copolymer rubber and vinyl resin. The butadiene-acrylonitrile rubber may be as described previously, while the vinyl resin is typically a vinyl chloride resin, especially polyvinyl chloride, or a copolymer based on vinyl chloride and a minor amount (49% or less) of a copolymerizable monomer such as vinyl acetate, vinylidene chloride or diethyl maleate, or a mixture of polyvinyl chloride and such copolymers may be used. The skin composition may be described as consisting of 60–85% of vinyl resin and correspondingly 40–15% of butadiene-acrylonitrile rubber, by weight, based on the weight of the two polymers, as the sole essential polymers. In one important aspect, the invention contemplates preparing the skin layer composition from a pre-fluxed latex blend of the butadiene-acrylonitrile rubber and at least a portion of the vinyl resin. Such pre-fluxed latex blends are described in British Patent 910,807, United States Rubber Co., published November 21, 1962. To prepare such pre-fluxed latex blend, an aqueous latex of butadiene-acrylonitrile rubber is blended with an aqueous latex of polyvinyl chloride or the like, typically in such proportions as to provide 70 parts of the nitrile rubber and 30 parts of the vinyl resin, in 100 parts of the two polymers. The mixed latex is then coagulated, for example by the addition of brine, and the mixed coagulum is dried and worked at an elevated temperature (e.g., 270° F. to 380° F.) sufficient to flux the blend thoroughly. Subsequently, sufficient solid polyvinyl chloride resin is added to the mix to bring the over-all proportion of vinyl resin to the desired level (for example, 37 parts of the pre-fluxed latex blend may be mixed with 63 parts of polyvinyl chloride resin, to bring the over-all proportions to 75 parts vinyl resin and 25 parts nitrile rubber). The mixture is again worked at elevated temperature to flux and blend it thoroughly.

An important aspect of the invention resides in the compounding of the skin layer for vulcanization or cure, preferably with a peroxide curative, particularly a di-tertiary alkyl peroxide, such as dicumyl peroxide (preferred), di-tertiary-butyl peroxide, 2,2-bis(tertiary-butyl-peroxy)butane, di-t-amyl peroxide, t-butyl 1-methyl-cyclohexyl peroxide, di - (3 - methyl-pentynyl)-3-peroxide, 2,2-bis(t-butyl-peroxy)-propane, and the like. Other organic peroxides in general may be used such as benzoyl peroxide, acetyl peroxide, tertiary-butyl hydroperoxide, succinyl peroxide, acetyl benzoyl peroxide, etc. Less preferably, sulfur or sulfur-yielding curatives, along with conventional accelerators, may be used to cure the nitrile rubber component of the skin layer. When the skin is thus compounded for cure of the rubbery portion of the skin composition, the skin in the final laminate is found to have remarkable hot strength, that is, the laminate can be elongated remarkably, in the process of shaping the laminate by drawing at elevated temperature, without splitting or cracking. The invention thereby makes it possible to provide even the most difficult shapes without the occurrence of undesirable surface defects.

The following are examples of compositions suitable for use as core, sub-strate and skin in the laminate of the invention (all parts are expressed by weight).

EXPANDED CORE

| Ingredients: | Parts |
| --- | --- |
| Butadiene-acrylonitrile rubber (32% acrylonitrile) | 34 |
| Styrene-acrylonitrile resin (70% styrene, 30% acrylonitrile) | 63 |
| Polyvinyl chloride resin | 3 |
| Diphenyl phthalate (processing aid and solid plasticizer) | 5 |
| Azodicarbonamide (Celogen AZ) | 2 |
| Zinc oxide (activator) | 1.5 |

SOLID SUB-STRATE

| Ingredients: | Parts |
| --- | --- |
| Styrene-acrylonitrile resin (30% styrene) | 59.5 |
| Butadiene-acrylonitrile rubber (32% acrylonitrile) | 25.5 |
| Polyvinyl chloride resin | 15 |
| Epoxidized soybean oil (plasticizer) | 2 |
| Barium-cadmium laurate | .3 |

CURABLE SKIN

1st stage mix

| Ingredients: | Parts |
| --- | --- |
| Pre-fluxed latex blend of butadiene-acrylonitrile rubber (70) and polyvinyl chloride resin (30) | 100 |
| Mixture of mono and di-otylated diphenyl amines | 1.5 |
| Di-tertiary-butyl-para-cresol | 1.0 |
| Barium-cadmium laurate | 2.5 |

The above first stage mix may be mixed in a Banbury mixer, the maximum allowable temperature being about 310° F.

2nd stage mix

| Ingredients: | Parts |
| --- | --- |
| Polyvinyl chloride resin | 64.3 |
| Product of above 1st stage mix | 37.5 |
| Di-tertiary-butyl-para-cresol | 1.1 |
| Titanium dioxide | 30.0 |
| Hydrogenated rosin | 1.5 |
| Dicumyl peroxide (40%) | 1.0 |

In the second stage mix, the various ingredients except for the dicumyl peroxide may be mixed on a mill at a temperature up to about 350° F. and the mix may be transferred to a cool mill for addition of the dicumyl peroxide (maximum stock temperature about 250° F.).

A typical unexpanded laminate consists of a core section of approximately 0.10 inch thick (assembled by any suitable conventional method, such as by calendering a sheet of this thickness, or by superimposing any required number of calendered sheets to give this thickness), a sub-strate sheet on both sides of the core 0.05 inch thick, and a surface outer skin of the curable nitrile rubber-vinyl resin composition on at least one surface (that exposed to outdoor aging), or on both surfaces, which is 0.025 inch thick. Where the skin layer is applied only to one surface of the laminate, it is highly desirable to apply a second sheet, or layer, of sub-strate stock to the other side so that a balanced construction is formed. The resulting laminate of superimposed layers is subjected to heat and pressure to cause adhesion of the various layers to each other, thereby forming an integral laminate. The heating is carried out for a time and temperature sufficient to bond together the plies and to cure the skin layer of the laminate, and sufficient to decompose the blowing agent in the core. Heating temperatures of about 300° F. for a period of about 30 minutes at a pressure of about 65 pounds per square inch gives satisfactory results. This laminating step may be carried out in a conventional vulcanizer, or it can be carried out in a hydraulic press. The vulcanizer or press laminating step is carried out at temperatures which will both cure all curable portions containing a curing agent, and will decompose the blowing agent. However, unless the mechanics of the composition and laminating conditions are such that the internal pressure developed exceeds the external pressure, there is very little likelihood that any appreciable expansion of the core stock will take place. The laminate, after laminating and curing, is thereafter heated in an unconfined state to effect the free expansion of the core stock. In typical practice of the invention, the heating step to effect expansion is an integral part of heating the laminate in order to soften it sufficiently to vacuum form it over any suitable form. The process of 3,070,817 as outlined in column 4, beginning at line 68, and in column 5, down through line 5, is typical of the procedure. After suitable heating to 285–300° F., the laminate is molded about a form by the use of vacuum (or above atmospheric pressure) as desired.

In the composition described above, the core stock, initially 0.1 inch (unexpanded), will expand to approximately 0.4 inch, although it will be obvious that in any final formed part, because of the deformation of the sheet, this thickness will exceed that of the thickness of the core in the final formed part.

The final laminate, protected by the described skin, is remarkable for its resistance to degradation on outdoor aging. The surface is relatively hard and not easily marred, and it does not readily pick up dirt. The surface readily lends itself to decoration with high gloss enamels and lacquers, and it is further particularly advantageous from the standpoint of ease of handling and processing in the factory.

It is desired to emphasize that the nitrile rubber-PVC blend used in the skin is, by itself, without value as a skin stock as it possesses very poor hot film strength, which means that when stocks are expanded and/or vacuum formed or thermoformed using such an uncured or uncrosslinked skin, the skin splits on the surface leaving the sub-strate and core layers exposed to degradation. The invention overcomes this by incorporating in the skin composition the necessary curing agents or crosslinking agents for the nitrile rubber portion. For this purpose the typical practice of the invention preferably uses from .5 to 5 parts of organic peroxide (preferably 1–1½ parts) or less preferably, from 0.5 to 2 parts of sulfur or sulfur-bearing compounds such as dipentamethylene thiuram tetrasulfide.

The hydrogenated wood rosin is incorporated in the skin stock formulation in order to improve the bond or adhesion between the skin stock and the sub-strate material.

It should also be noted that the skin formulation is free of any liquid plasticizer, being totally plasticized by the nitrile rubber. This improves the long term aging properties as the plasticizer is not lost through volatilization, leaching, etc. Further, there is no migration of plasticizer from one layer to another, on to adjacent surfaces. However, a small amount of epoxidized soybean oil (a polymeric plasticizer) may be added in some cases to act as a stabilizer for the system (0–3 parts).

By leaving out curing agents (sulfur) for the core and sub-strate portions of the laminate, processing of the compounds in the factory is simplified by eliminating, or at least materially reducing, the possibilities of scorching the stock. Further, as long as the core and sub-strate are not cured, they can be easily reprocessed as new core and sub-strate materials. Thus, the only layer in which a curing agent is typically used in the invention is the skin layer. However, it is possible, if circumstances call for it, to use sulfur cured sub-strates and/or core sections with the crosslinked nitrile rubber-vinyl resin skin composition.

Having thus described my invention, what I claim and desire to protect by Letters Patent is:

1. A rigid, heat-formable laminated sheet material comprising a core sheet of rigid cellular gum plastic material which is a blend of from 51 to 90 parts by weight of resin and correspondingly from 49 to 10 parts by weight of butadiene-acrylonitrile rubber, the said resin being selected from the group consisting of styrene-acrylonitrile resin and mixtures of styrene-acrylonitrile resin with polyvinyl chloride resin, a rigid sheet of solid gum plastic material of the said composition integrally united to each face of said core sheet, and an outer protective skin of flexible, adherent material overlying at least one outer surface of said laminate, said skin being a composition comprising 60 to 85% by weight of polyvinyl chloride resin and correspondingly 40 to 15% by weight of butadiene-acrylonitrile rubber, the said butadiene-acrylonitrile rubber in the skin being cured, the said skin being devoid of liquid plasticizer and the said butadiene-acrylonitrile rubber in the skin being the sole essential plasticizer for the polyvinyl chloride resin therein.

2. A laminate as in claim 1, in which the butadiene-acrylonitrile rubber in the skin is cured with an organic peroxide.

3. A rigid, heat-formable laminated structural material comprising an expanded core layer, solid sub-strate layers on each face of said core layer, and a protective skin layer on the outer surface of at least one of said sub-strate layers, said core and sub-strate layers comprising a gum plastic composition containing rubber and resin selected from the compound consisting of (a) physical mixtures of butadiene-acrylonitrile rubber and a resin selected from the group consisting of styrene-acrylonitrile resin and mixtures of styrene-acrylonitrile resin with polyvinyl chloride resin, (b) graft copolymers of styrene and acrylonitrile resin forming monomers on polybutadiene rubber, and (c) mixtures of (b) with resin selected from the group consisting of styrene-acrylonitrile resin and mixtures of styrene-acrylonitrile resin with polyvinyl chloride resin, the said skin layer comprising a mixture of from 60 to 85% by weight of polyvinyl chloride resin and correspondingly from 40 to 15% by weight of cured butadiene-acrylonitrile rubber, said core and sub-strate layers containing from 51 to 90 parts by weight of said rubber and correspondingly from 49 to 10 parts by weight of said resin, the said skin layer being devoid of liquid plasticizer and the said butadiene-acrylonitrile rubber in the skin being the sole essential plasticizer for the polyvinyl chloride resin in the skin.

References Cited by the Examiner

UNITED STATES PATENTS

| | | | |
|---|---|---|---|
| 3,015,640 | 1/62 | Weaver et al. | 260—45.5 |
| 3,041,220 | 6/62 | Martin et al. | 161—161 |
| 3,070,817 | 1/63 | Kohrn et al. | 161—254 X |

EARL M. BERGERT, *Primary Examiner.*

MORRIS SUSSMAN, *Examiner.*

UNITED STATES PATENT OFFICE
CERTIFICATE OF CORRECTION

Patent No. 3,206,354                                September 14, 1965

Robert W. Pooley

It is hereby certified that error appears in the above numbered patent requiring correction and that the said Letters Patent should read as corrected below.

Column 6, line 18, after "composition" insert a comma; same line 18, after "resin" insert a comma; line 19, for "compound" read -- group --.

Signed and sealed this 17th day of January 1967.

(SEAL)
Attest:

ERNEST W. SWIDER                           EDWARD J. BRENNER
Attesting Officer                              Commissioner of Patents